United States Patent [19]

Herman et al.

[11] 4,247,661

[45] Jan. 27, 1981

[54] THERMOPLASTIC POLYMER BLENDS COMPRISING EP OR EPDM POLYMERS AND HIGHLY CRYSTALLINE POLYALLOMERS

[75] Inventors: Richard M. Herman, Elyria; Martin Batiuk, Grafton, both of Ohio

[73] Assignee: The B. F. Goodrich Company, Akron, Ohio

[21] Appl. No.: 106,624

[22] Filed: Dec. 26, 1979

Related U.S. Application Data

[63] Continuation-in-part of Ser. No. 218, Jan. 2, 1979, abandoned.

[51] Int. Cl.³ .............................................. C08L 23/16
[52] U.S. Cl. ....................................... 525/88; 525/95; 525/97; 525/211; 525/240
[58] Field of Search ................. 525/88, 95, 97, 240, 525/211

[56] References Cited

U.S. PATENT DOCUMENTS

| | | | |
|---|---|---|---|
| 3,478,128 | 11/1969 | Hagemeyer et al. | 260/876 |
| 3,529,037 | 9/1970 | Hagemeyer et al. | 260/878 |
| 3,806,558 | 4/1974 | Fischer | 260/897 |
| 4,086,301 | 4/1978 | Zerpner et al. | 260/876 B |

FOREIGN PATENT DOCUMENTS 1440659 6/1976 United Kingdom .

*Primary Examiner*—Carman J. Seccuro
*Attorney, Agent, or Firm*—J. Hughes Powell, Jr.

[57] ABSTRACT

Certain thermoplastic blends have substantially improved hot strength (i.e., cohesive strength and resistance to sagging or tearing during milling or other hot processing). The blends comprise (1) at least one ethylene-propylene (EP) or ethylene-propylene-diene (EPDM) polymer and (2) at least one highly crystalline polyallomer, and are useful for tubing, wire and cable insulation, molded items and the like.

7 Claims, No Drawings

THERMOPLASTIC POLYMER BLENDS COMPRISING EP OR EPDM POLYMERS AND HIGHLY CRYSTALLINE POLYALLOMERS

CROSS-REFERENCE TO RELATED APPLICATION

This application is a Continuation-in-part of our copending application Ser. No. 000,218 filed Jan. 2, 1979 now abandoned.

BACKGROUND OF THE INVENTION

Blends of certain EP or EPDM polymers with crystalline polypropylene (optionally containing up to about 10% of another α-olefin) are disclosed in U.S. Pat. No. 4,036,912. U.S. Pat. No. 3,515,775 describes three component blends of (1) an amorphous EP or EPDM polymer, (2) crystalline polypropylene (including polyallomers or copolymers of propylene), and (3) crystalline polyethylene. U.S. Pat. No. 3,632,674 discloses three component blends comprising (1) a crystalline EP block copolymer, (2) crystalline polypropylene (optionally containing up to about 10% of another α-olefin, and (3) an ethylene polymer or statistical copolymer of ethylene containing not more than 10 wt. % of an α-olefin. Each of these references teaches propylene homo-and copolymers as essentially interchangeable in the blends described therein.

Past work with blends of EP or EPDM polymers and propylene homopolymers (including isotactic polypropylene having more than 80% crystallinity) has demonstrated such blends to have moderate hot strength (i.e., cohesive strength and resistance to sagging or tearing during milling or other hot processing). Similar results were obtained by blending EP or EPDM polymers with many other components, (e.g., low density polyethylene, polyvinyl chloride, polybutylene, polystyrene, poly(ethylene/ethyl acrylate), poly(ethylene/vinyl acetate) and poly(ethylene/acrylic acid).

New polymer blends are desired having substantially improved hot strength.

SUMMARY OF THE INVENTION

Certain thermoplastic blends have substantially improved hot strength (i.e., cohesive strength and resistance to sagging or tearing during milling or other hot processing). The blends comprise (1 ) a major proportion of at least one ethylene-propylene (EP) or ethylene-propylene-diene (EPDM) polymer and (2) at least one polyallomer having at least 70 percent crystallinity (determined by solubility in refluxing hexane) and consisting essentially of interpolymerized units of (a) straight and branched chain aliphatic alpha-monoolefins containing 3 to 10 carbon atoms and (b) from about 1 to about 20 weight percent ethylene.

DETAILED DESCRIPTION

The thermoplastic polymer blends of this invention comprise (1) 100 weight parts of at least one ethylene-propylene (EP) or ethylene-propylene-diene (EPDM) polymer and (2) at least about 5 weight parts, more preferably from about 5 weight parts to about 99 weight parts, and even more preferably from about 10 weight parts to about 50 weight parts of at least one polyallomer having at least 70 percent crystallinity (determined by solubility in refluxing hexane) and comprising polymerized units of (a) straight and branched chain aliphatic alpha-monoolefins containing 3 to 10 carbon atoms and (b) from about 1 to about 20 weight percent ethylene.

The polymer blends are truly thermoplastic, having excellent strength and structural stability at ambient temperatures, as well as easy processability at temperatures about 170° C. A smooth roll is formed in milling operations at such temperatures, and the blends are readily extrudable and moldable, having good flow properties. Formed items made from the blends are reprocessable.

EP And EPDM Polymers

The EP polymers used consist essentially of interpolymerized units of about 63 wt. % to about 85 wt. % ethylene and about 15 wt. % to about 37 wt. % propylene. The EPDM polymers used consist essentially of interpolymerized units of about 63 wt. % to about 85 wt. % ethylene, about 5 wt. % to about 36.8 wt. % propylene, and about 0.2 wt. % to about 15 wt. % diene. Preferably, ethylene constitutes from about 68 wt. % to about 78 wt. %, propylene from about 17 wt. % to about 31 wt. %, and the diene from about 2 wt. % to about 10 wt. % of the EPDM polymer. Suitable diene monomers include conjugated dienes such as butadiene, isoprene, chloroprene, and the like; nonconjugated dienes containing from about 5 to about 25 carbon atoms such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like, alkylbicyclononadienes such as 3-methylbicyclo-(4,2,1)-nona-3,7-diene, and the like, indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclodienes such as 3-methyltricyclo $(5,2,1,0^{2,6})$-deca-3,8-diene and the like. More preferred dienes include the nonconjugated dienes. Excellent results were obtained using alkenyl norbornenes and nonconjugated dienes, specifically 5-ethylidene-2-norbornene and 1,4-hexadiene.

The EP and EPDM polymers can be prepared readily following known suspension and solution techniques, such as those described in U.S. Pat. No. 3,646,169 and in Friedlander, Encyclopedia of Polymer Science and Technology, Vol. 6, pp. 338-386 (New York, 1967). The EP and EPDM polymers are high molecular weight, solid materials. They typically have a Mooney viscosity of at least about 20, preferably from about 25 to about 150 (ML 1+8 @ 125° C.), and a dilute solution viscosity (DSV) of at least about 1, preferably from about 1.3 to about 3 measured at 25° C. as a solution of 0.1 gram of EPDM polymer per deciliter of toluene. The raw polymers may have typical green tensile strengths from about 800 psi to about 1,800 psi, more typically from about 900 psi to about 1,600 psi, and an elongation at break of at least about 600 percent.

The EP and EPDM polymers employed typically also have unstretched crystallinity ranging from about 1% to about 25% based upon the weight of polymer. The unstretched crystallinity of the polymers is measured using a known X-ray technique described by Natta et al, 8 Atti Accad-Nazi. Rend. 11 (1957). The exact method used comprises pressing a 0.020 inch thick film of a particular polymer at 120° C. and 20,000 psi. The film is cooled quickly (quenched), annealed at room temperature for at least 24 hours, mounted and exposed to X-rays, with a diffraction scan being made across an angular range. Using a diffractometer, a plot is made of the angular distribution of the radiation scattered by the film. This plot is seen as a diffraction pattern of sharp crystalline peaks superimposed upon an amorphous peak. A quantitative value of weight percent crystallinity is obtained by dividing the crystalline diffraction area by the total diffraction area of the plot.

The EP and EPDM polymers used in the present invention also generally exhibit a melt endotherm from about 1 to about 15 calories/gram, preferably from about 2 to about 10 calories/gram. The melt endotherm is measured using a Differential Scanning Calorimeter (DSC) sold by the Perkin-Elmer Corporation as the Perkin-Elmer DSC-2. The test measures heat of fusion within the polymer. A completely amorphous EP or EPDM polymer would have a zero melt endotherm. The test consists of placing a polymer sample of known weight, which has been annealed at room temperature for at least 24 hours, in a closed aluminum pan (DSC cell calorimeter pans were used). The polymer sample in the pan is heated at a rate of 10° C./minute over a temperature range from −100° C. to +140° C. The reference material is glass beads. The DSC chart is precalibrated, using metals having known heats of fusion, in order to provide a chart having a unit area in terms of calories/square inch/minute. As the polymer sample is heated, a crystalline melt point peak appears on the chart. The area under the crystalline melt point peak is measured, and the melt endotherm in calories/gram is calculated from the area obtained. Two melt endotherm measurements can be obtained from one test, i.e., a measurement on heating the sample and a measurement on cooling the sample.

Polyallomers

The polyallomers employed in the present invention are solids consisting essentially of interpolymerized units of (a) straight and branched chain aliphatic alpha-monoolefins containing 3 to 10 carbon atoms, with propylene being preferred, and (b) from about 1 to about 20 wt. % ethylene,. more preferably from about 1 to about 10 wt. % ethylene. These polyallomers also have at least 70 percent crystallinity, measured by refluxing the polymer in hexane, the portion of the solid polymer insoluble in refluxing hexane being the crystalline portion. Such highly crystalline polyallomers can be prepared, for example, by following the teachings of U.S. Pat. No. 3,679,775.

Thermoplastic Polymer Blends

The compositions of the present invention comprise thermoplastic blends of (1) at least one ethylene-propylene (EP) or ethylene-propylene-diene (EPDM) polymer and (2) at least one highly crystalline polyallomer, all of which have been described heretofore. Surprisingly, these blends have hot strength (i.e., cohesive strength and resistance to sagging or tearing during milling or other hot processing) substantially better than many other polymer blends. Such improved hot strength results in easier, more rapid processing during milling, calendering, and other hot processing operations.

A wide range of rubber and plastic compounding ingredients are mixed readily with the thermoplastic polymer blends using mixing equipment such as two-roll mills, extruders, Banbury mixers, and the like. Standard addition and mixing techniques are used. No curing or crosslinking agents are needed, but they may be used. In some cases, the addition of compounding ingredients, particularly waxes, plasticizers, and extenders, can detract from the overall tensile strengths of the thermoplastic blends. In contrast, reinforcing fillers such as fumed silica generally provide increased tensile strengths to the blends.

Examples of suitable compounding ingredients include metal oxides such as zinc, calcium, and magnesium oxide, lead monoxide and dioxide; fatty acids such as stearic and lauric acid, and salts thereof such as cadmium, zinc and copper stearate and lead oleate; fillers such as the carbon blacks including channel blacks, high reinforcing blacks as N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like; plasticizers and extenders such as dialkyl and diaryl organic acids like diisobutyl, diisodecyl, and dibenzyl oleates, stearates, sebacates, azelates, phthalates, and the like; ASTM type 2 petroleum oils, ASTM D2226 aromatic, naphthalenic and paraffinic oils, castor oil, tall oil, glycerin and the like; antioxidants, antiozonants, and stabilizers such as di-$\beta$-naphthyl-p-phenylenediamine, phenyl-$\beta$-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2,2'-methylenebis-(4-ethyl-6-t-butyl phenol), 2,2'-thiobis-(4-methyl-6-t-butyl phenol), bisphenol-2,2'-methylenebis-6-t-butyl-4-ethylphenol, 4,4'-butylidenebis-(6-t-butyl-m-cresol), 2-(4-hydroxy-3,5-butylaniline)-4,6-bis(octylthio)-1,3,5-triazine, hexahydro-1,3,5-tris-$\beta$-)3,5-di-t-butyl-4-hydroxyphenol)propionyl-s-triazine, tris-(3,5-di-t-butyl-4-hydroxybenzyl) isocyanurate, tetrakismethylene-3-(3', 5'-di-t-butyl-4'-hydroxyphenyl)-propionate methane, distearyl thiodipropionate, dilauryl thiodipropionate, tri(nonylatedphenyl)phosphite, and the like; and other ingredients such as pigments, tackifiers, flame retardants, fungicides, and the like. Such ingredients are used in levels well known to those skilled in the art.

Applications for the thermoplastic polymer blends include tubing, wire and cable insulation, molded items such as shoe soles and kitchen ware, sheet products such as mats and liners (including pond liners for aeration ponds in sewage treatment plants), and the like.

The following examples illustrate the present invention more fully.

EXAMPLES

General Mixing Procedure

The polymeric components of the blends, along with compounding ingredients (if used), were mixed together using a 6-inch, two-roll mill. Front roll temperature was about 175° C., with the back roll slightly cooler. The EPDM polymer was banded on the mill, and the other polymer and compounding (if used) ingredients were added to the banded polymer. Milling time was about 5 minutes.

The mixing conditions described above are not critical. The important factor is to achieve uniform dispersion of the polymers and other ingredients in the thermoplastic blend. This object can be accomplished using other equipment, such as a Banbury mixer, by mixing at other temperatures and for other times, and the like. Such conditions and procedures are well known to the person skilled in the art. The above conditions were used to achieve thorough mixing, and are outlined to illustrate preparation of the physical blends of the examples.

Test Results

One hundred weight parts of an EPDM polymer (containing copolymerized therein 72 wt. % ethylene, 24 wt. % propylene, and 4 wt. % 5-ethylidene-2-norbornene, and having a Mooney viscosity of about 50 [ML 1+8 (125° C.)] was milled according to the above procedure together with 20 weight parts of polyallomeric poly(propylene/ethylene) containing about 2 wt. % polymerized ethylene and having a crystallinity (as determined by solubility in refluxing hexane) greater than 70%. The blend was found to have excellent hot strength during milling, i.e., it had excellent cohesive strength and neither sagged nor tore during milling or while being stripped from the mill for further processing. As a result, the speed of the milling operation was enhanced substantially.

In sharp contrast, a number of other polymer blends were evaluated and found to have substantially lower hot strength, including blends of the EPDM polymer just described with each of the following polymers: low density polyethylene, polyvinyl chloride, polybutylene, polypropylene (i.e., isotactic polypropylene having more than 80% crystallinity), polystyrene, poly(ethylene/ethyl acrylate), poly(ethylene/ vinyl acetate) and poly(ethylene/acrylic acid). Also having noticeably lower hot strength were blends of the above EPDM polymer with numerous ethylene/propylene copolymers containing about 45 to about 75 wt. % ethylene (25 to 55 wt. % propylene) and having low crystallinities (typically less than about 20 percent).

We claim:

1. A polymer blend having excellent hot strength comprising
   (1) A major proportion of at least one EP polymer consisting essentially of interpolymerized units of about 63 weight percent to about 85 weight percent ethylene and about 15 weight percent to about 37 weight percent propylene, or at least one EPDM polymer consisting essentially of interpolymerized units of about 63 weight percent to about 85 weight percent ethylene, about 5 weight percent to about 36.8 weight percent propylene, and about 15 weight percent of a diene monomer, said polymers having unstretched crystallinity from about 1% to about 25% and melt endotherms from about 1 to about 15 calories/gm, and
   (2) at least one polyallomer having at least 70 percent crystallinity (determined by solubility in refluxing hexane) and consisting essentially of interpolymerized units of (2) straight and branched chain aliphatic alpha-monoolefins containing 3 to 10 carbon atoms and (b) from about 1 to about 20 weight percent ethylene.

2. A polymer blend having excellent hot strength comprising
   (1) 100 weight parts of at least one EP polymer consisting essentially of interpolymerized units of about 63 weight percent to about 85 weight percent ethylene and about 15 weight percent to about 37 weight percent propylene, or at least one EPDM polymer consisting essentially of interpolymerized units of about 63 weight percent to about 85 weight percent ethylene, about 5 weight percent of a diene monomer, said polymers having unstretched crystallinity from about 1% to about 25% and melt endotherms from about 1 to about 15 calories/gm, and
   (2) at least about 5 to 99 weight parts of at least one polyallomer having at least 70 percent crystallinity (determined by solubility in refluxing hexane) and consisting essentially of interpolymerized units of (a) straight chain and branched chain aliphatic alpha-monoolefins containing 3 to 10 carbon atoms and (b) from about 1 to about 20 weight percent ethylene.

3. A polymer blend of claim 1 wherein said alpha-monoolefin is propylene.

4. A polymer blend of claim 3 wherein said polymer (1) is an EPDM polymer, and said diene monomer is nonconjugated.

5. A polymer blend of claim 4 wherein said nonconjugated diene monomer is an alkenyl norbornene.

6. A polymer blend of claim 5 wherein said alkenyl norbornene is 5-ethylidene-2-norbornene.

7. A polymer blend of claim 3 wherein about 10 to about 50 weight parts of polyallomer is used per 100 weight parts of EP or EPDM polymer.

* * * * *